United States Patent [19]
Orns

[11] Patent Number: 5,411,109
[45] Date of Patent: May 2, 1995

[54] VEHICULAR HOOD PROP APPARATUS

[76] Inventor: Daryl L. Orns, P.O. 373, Wolcott, Ind. 47995

[21] Appl. No.: 78,923

[22] Filed: Jun. 21, 1993

[51] Int. Cl.⁶ ............................................... B62D 25/10
[52] U.S. Cl. ..................................... 180/69.2; 248/352
[58] Field of Search ................. 180/69.2, 69.21, 69.24; 248/352; 292/288

[56] References Cited

U.S. PATENT DOCUMENTS

| | | | |
|---|---|---|---|
| 2,322,630 | 6/1943 | Greig | 180/69.21 |
| 4,206,944 | 6/1980 | Kumgai et al. | 180/69.21 |
| 5,263,546 | 11/1993 | Cady et al. | 180/69.21 |

Primary Examiner—Richard M. Camby

[57] ABSTRACT

A hood prop includes respective first, second, and third articulated leg members arranged for reception within a vehicular engine compartment, wherein the first and second legs are arranged in abutment with the vehicular hood and the engine compartment, wherein the third leg is arranged for securing of the first leg at a predetermined angulated orientation, wherein the second leg is arranged for mounting between the hood and engine compartment spaced from the first and third legs.

4 Claims, 4 Drawing Sheets

VEHICULAR HOOD PROP APPARATUS

BACKGROUND OF THE INVENTION

1. Field of the Invention

The field of invention relates to vehicular support apparatus, and more particularly pertains to a new and improved vehicular hood prop apparatus wherein the same is arranged for the positioning of a vehicular hood during repair of an associated vehicular body.

2. Description of the Prior Art

In the removal of a vehicular fender relative to contemporary vehicles, the vehicular fender typically is arranged as a mounting for the hood. Accordingly, upon removal of the hood, support for the hood is eliminated, wherein the instant invention is arranged to provide for support for the hood during replacement and repair of an associated vehicular fender and in this respect, the present invention substantially fulfills this need.

U.S. Pat. No. 4,920,592 to Scott is an example of a prior art vehicular hood prop, wherein the same is typically formed in a mounted construction relative to an associated vehicular hood.

SUMMARY OF THE INVENTION

In view of the foregoing disadvantages inherent in the known types of hood support apparatus now present in the prior art, the present invention provides a vehicular hood prop apparatus wherein the same is arranged for the temporary positioning and support of a vehicular hood. As such, the general purpose of the present invention, which will be described subsequently in greater detail, is to provide a new and improved vehicular hood prop apparatus which has all the advantages of the prior art vehicular hood support structure and none of the disadvantages.

To attain this, the present invention includes a hood prop including respective first, second, and third articulated leg members arranged for reception within a vehicular engine compartment, wherein the first and second legs are arranged in abutment with the vehicular hood and the engine compartment, wherein the third leg is arranged for securing of the first leg at a predetermined angulation orientation, wherein the second leg is arranged for mounting between the hood and engine compartment spaced from the first and third legs.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular hood prop apparatus which has all the advantages of the prior art vehicular hood support structure and none of the disadvantages.

It is another object of the present invention to provide a new and improved vehicular hood prop apparatus which may be easily and efficiently manufactured and marketed.

It is a further object of the present invention to provide a new and improved vehicular hood prop apparatus which is of a durable and reliable construction.

An even further objector the present invention is to provide a new and improved vehicular hood prop apparatus which is susceptible of a low cost of manufacture with regard to both materials and labor, and which accordingly is then susceptible of low prices of sale to the consuming public, thereby making such vehicular hood prop apparatus economically available to the buying public.

Still yet another object of the present invention is to provide a new and improved vehicular hood prop apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
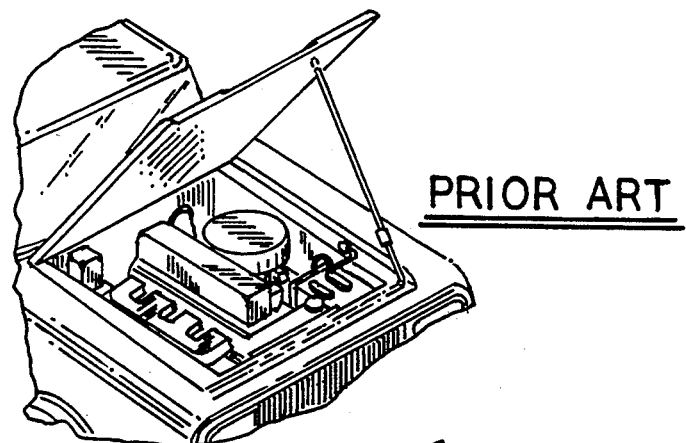
FIG. 1 is an isometric illustration of a prior art vehicular hood support, as indicated in U.S. Pat. No. 4,920,592.

With reference now to the drawings, and in particular to FIGS. 1 to 8 thereof, a new and improved vehicular hood prop apparatus embodying the principles and concepts of the present invention and generally designated by the reference numeral 10 will be described.

Figure 2:
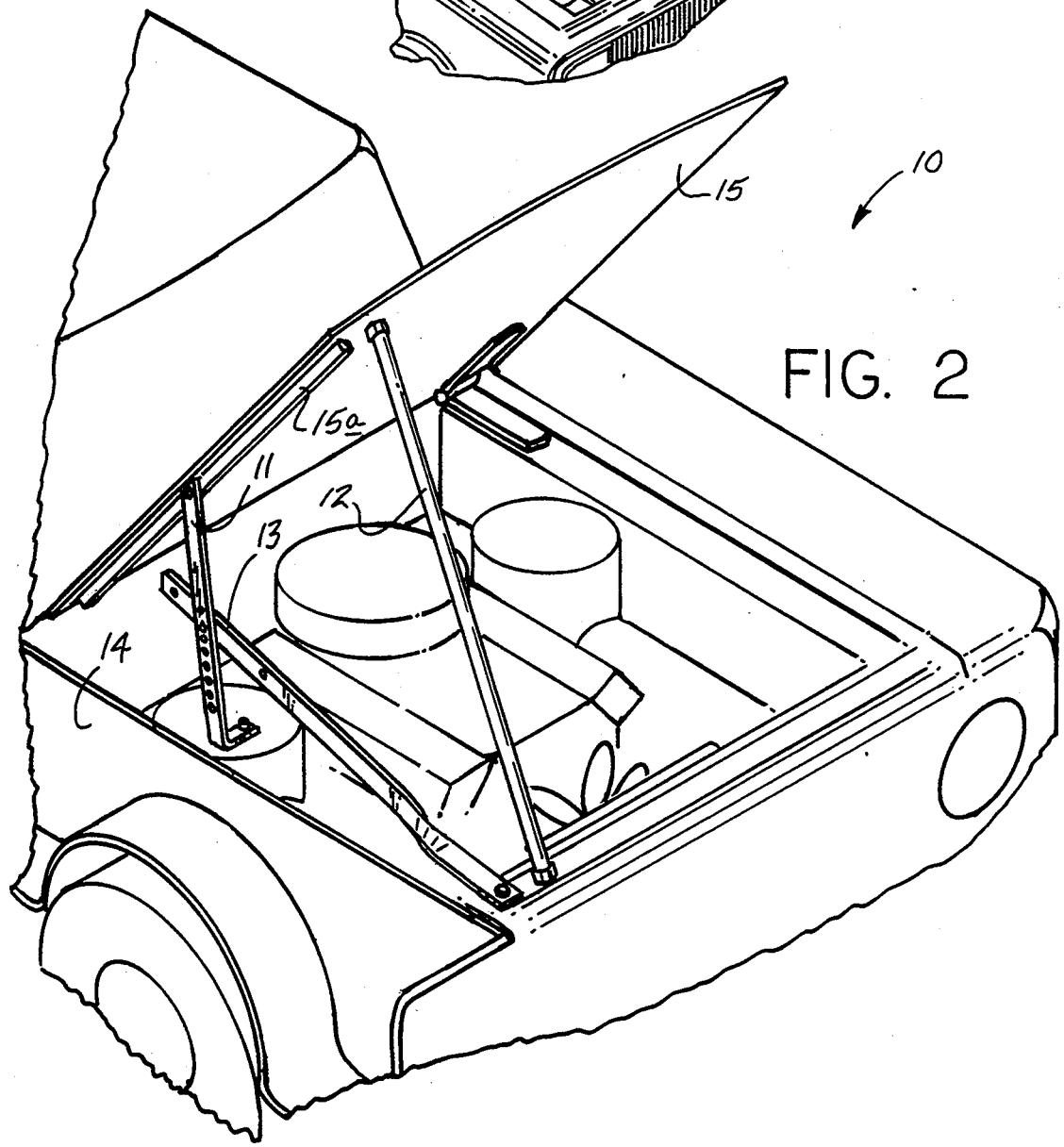
FIG. 2 is an isometric illustration of the invention in use.
Figure 3:
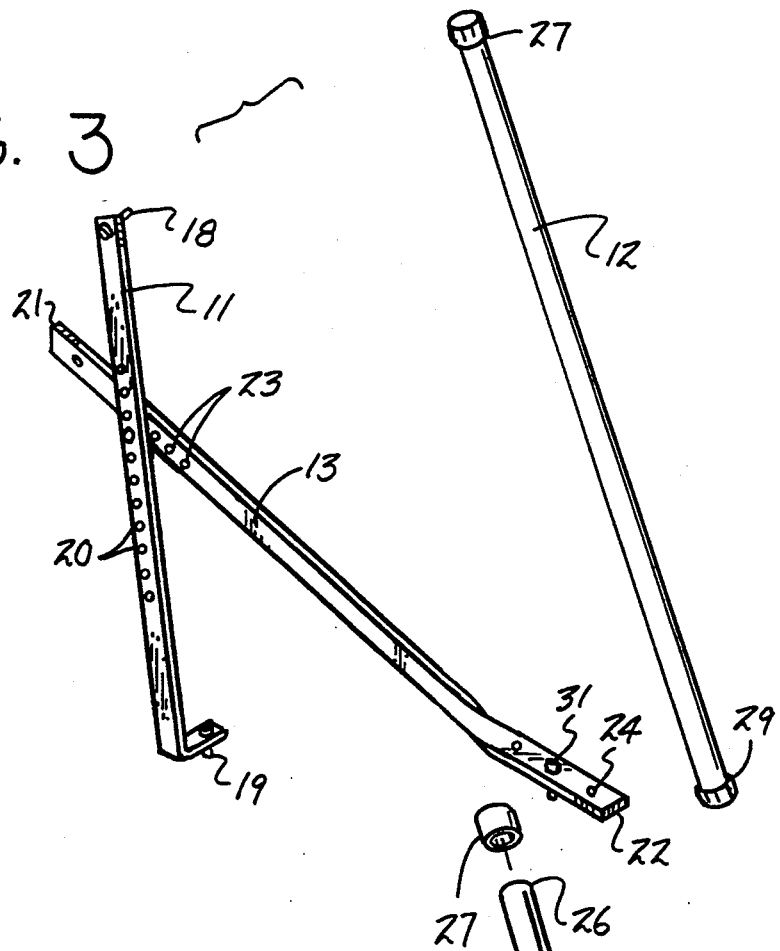
FIG. 3 is an isometric illustration of the invention indicating the articulated relationship.
Figure 4:
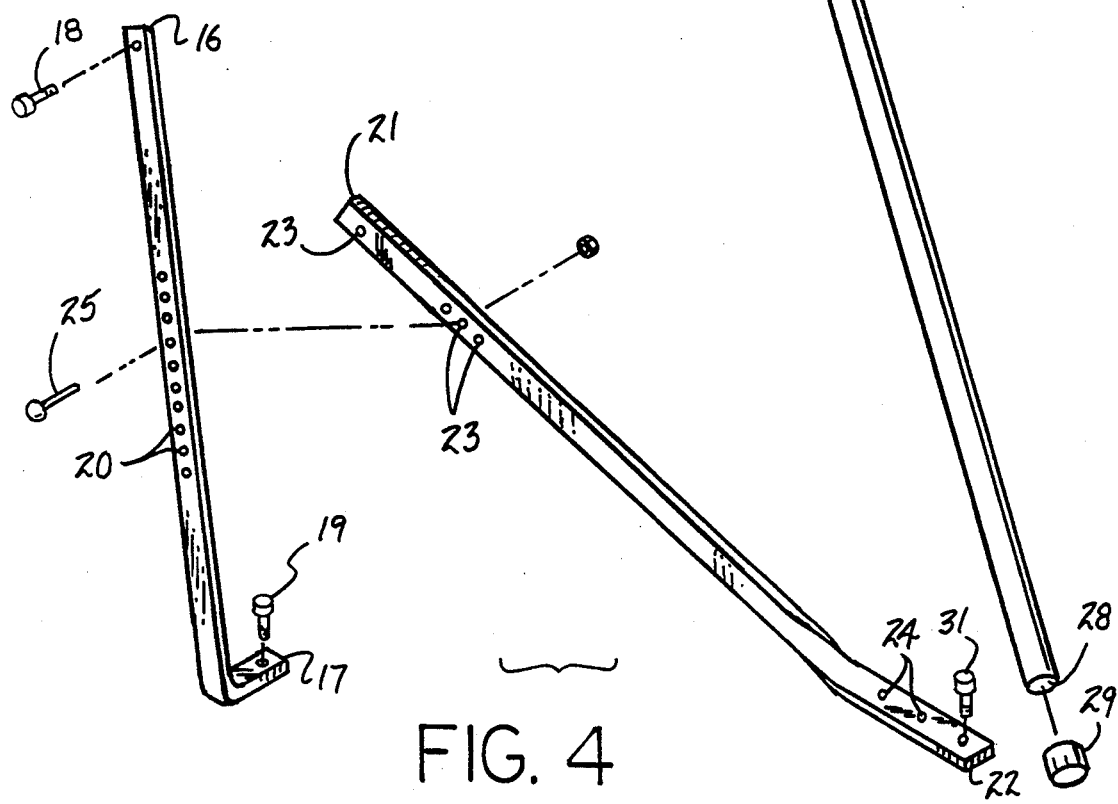
FIG. 4 is an isometric exploded illustration of the invention and the various components thereof.

More specifically, the vehicular hood prop apparatus 10 of the instant invention essentially comprises a first rigid leg 11 spaced from a second rigid leg 12, with a third rigid leg 13 mounted intermediate the first and second rigid legs 11 and 12 to permit articulation of the first rigid leg 11 relative to the vehicular hood having a hood side rail 15a. Fixed positioning of the first rigid leg 11 relative to the third rigid leg 13 is provided. The organization is arranged for positioning within the vehicular motor compartment, having the associated vehicular hood 15 and a vehicular fender 14 to be repaired and/or replaced. To provide for temporary mounting and positioning of the hood, the first leg includes a first leg first end and a first leg second end 16 and 17 respectively (see FIG. 3) includes respective first and second end fasteners 18 and 19 directed therethrough. The first fastener 18 orthogonally directed through the first leg adjacent the first leg first end 16 is orthogonally oriented through the first leg for securement to the vehicular hood side rail 15a. The first leg second end 17 is orthogonally oriented relative to the body of the first leg to define a generally L-shaped first leg structure, such that the second fastener 19 is orthogonally oriented relative to the first fastener 18 and parallel to the main body of the first leg 11. A linear row of first leg apertures 20 are directed through the first leg between the first and second ends 16 and 17. The second leg 12 includes a second leg first free end 26 spaced from a second leg second free end 28, wherein second leg first and second end resilient caps 27 and 29 are mounted to respective second leg first and second free ends. The second leg 12 accordingly is arranged to form a positionable prop between the hood 15 and a lowermost structural support within the engine compartment at a forwardmost end of the engine compartment, in a manner as illustrated in FIG. 2, to provide for positioning of the hood 15 subsequent to the mounting of the first and third legs 11 and 13. The third leg 13 includes a third leg first end 21 spaced from a third leg second end 22. A linear row of third leg first apertures 23 extending from the third leg first end 21 are orthogonally oriented to a linear row of third leg second apertures 24. A third fastener 25 is directed through one of the first leg apertures 20 and through one of the third leg first apertures 23. A fourth fastener 31 orthogonally oriented to and directed through one of the third leg second apertures 24 for mounting to the vehicular engine compartment. In this manner, such as indicated in FIG. 3, desired articulation and angulation of the first and third legs relative to one another are provided and for positioning of the second leg in abutment with the vehicular hood 15 and within the associated engine compartment.

Figure 5:
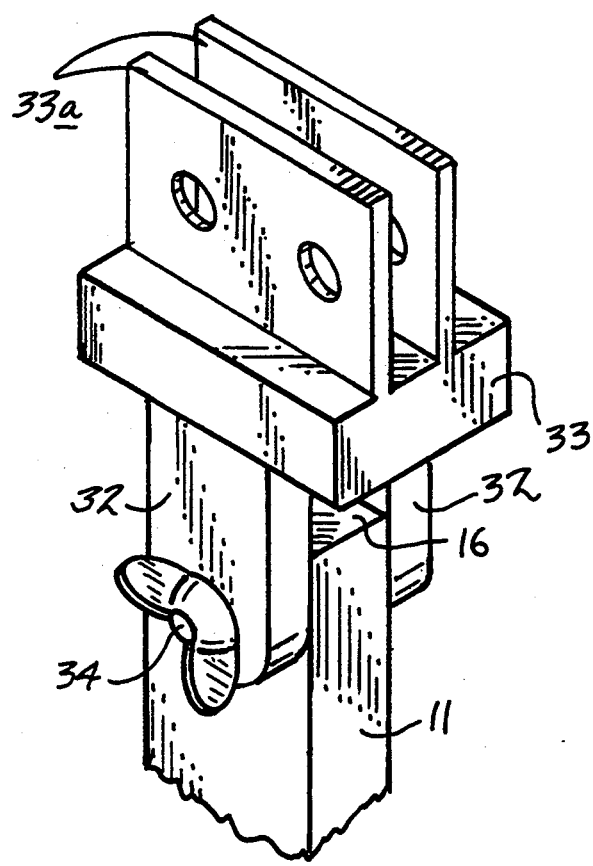
FIG. 5 is an isometric illustration of a modified first leg first end portion.
Figure 6:
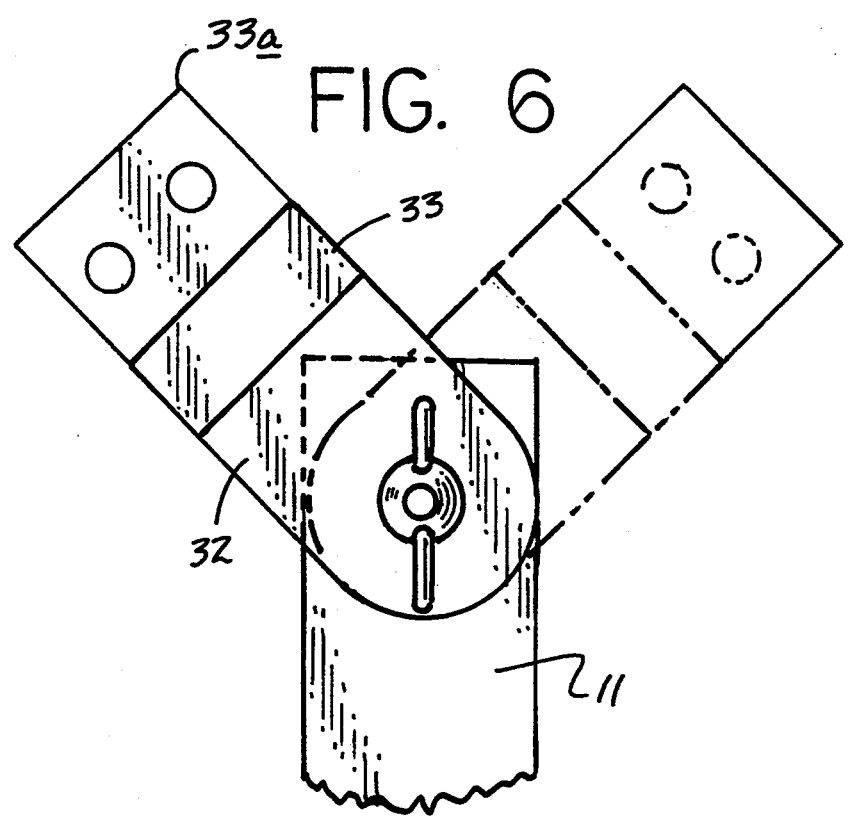
FIG. 6 is an orthographic side view of the organization as indicated in FIG. 5.
Figure 7:
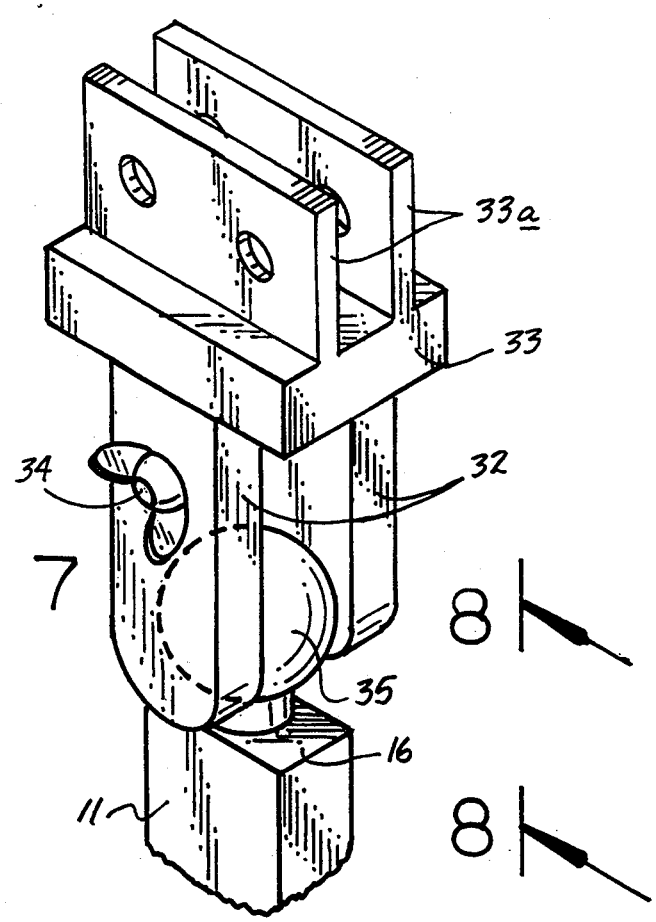
FIG. 7 is an isometric illustration of a modified second leg first end portion.
Figure 8:
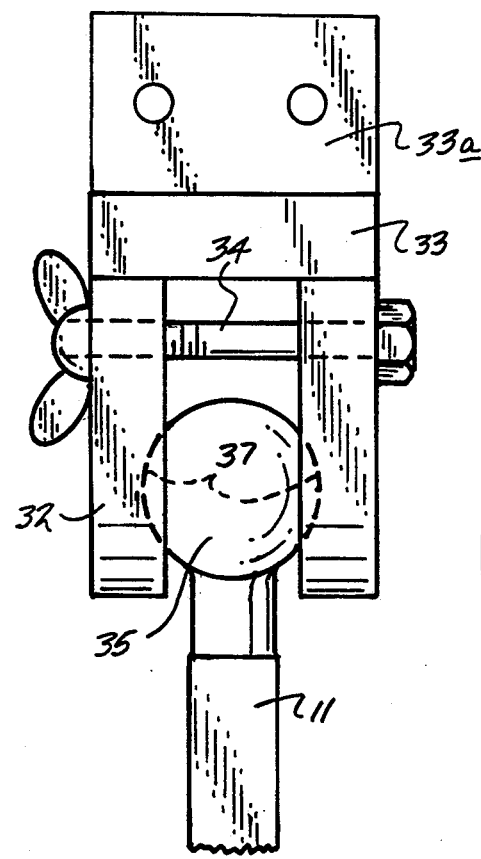
FIG. 8 is an orthographic view, taken along the lines 8—8 of FIG. 7 in the direction indicated by the arrows.

Reference to FIG. 5 indicates the first leg 11 having at the first leg first end 16 a pair of first spaced locking plates 32 arranged in a parallel coextensive relationship, having a locking leg first fastener 34 orthogonally directed through the first leg and through the first locking plates 32 arranged for pivotally securing the first leg locking plates in a predetermined orientation, head 33 is mounted to the first locking plates 32 for mounting of parallel securement flanges 33a arranged orthogonally to the head 33. The flanges 33a receive the third fastener 18 therethrough, with the hood side rail 15a received therebetween. Reference to FIGS. 7 and 8 indicates the first leg first end 16 having the locking plates 32, each including facing semi-spherical recesses 37 securing a spherical head 35 therebetween, as the spherical head is mounted to the first leg first end 16, as illustrated in the FIGS. 7 and 8. The fastener 34 accordingly is orthogonally directed between the second locking plates 36 for clamping the spherical head 35 therebetween, wherein the head 33 is arranged for greater accommodation of the vehicular hood rail 15a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular hood prop apparatus, for supporting a vehicular hood wherein the apparatus comprises, a first rigid leg spaced and structurally separated relative to a second rigid leg, and a third rigid leg structurally separated from the second leg, the third rigid leg having a third leg first end and a third leg second end, the third leg adjustably mounted to the first rigid leg adjacent to the third leg first end, and the third leg second end adjustably mounted within a vehicular engine compartment, with the second leg having a second leg first free end for engaging the vehicular engine compartment and the second leg having a second leg second free end for engaging the vehicle hood.

2. An apparatus as set forth in claim 1 wherein the first rigid leg includes a first leg first end and a first leg second end, the second rigid leg having a second leg first end and a second leg second end, and a linear row of first leg apertures directed through the first leg intermediate the first leg first end and the first leg second end, with the third leg having a linear row of third leg first apertures directed through the third leg extending from the third leg first end, with the first fastener directed through one of said first leg apertures and through one of said third leg first apertures, and the second leg including a resilient first cap mounted to the second leg first end and a resilient second cap mounted to the second leg second end, and the third leg having a third leg linear row of second apertures adjacent the third leg second end, wherein a second fastener is directed through one of the third leg second apertures and through one of the second leg apertures, the second fastener obliquely oriented relative to the first fastener.

3. An apparatus as set forth in claim 2 wherein the first leg first end includes a pair of first spaced locking plates arranged in a parallel relationship relative to one another, having a locking leg first fastener directed orthogonally through the first locking plates and through the first leg adjacent the first leg first end, with the first locking plates having a head fixedly and orthogonally mounted to the first locking plates, a plurality of spaced parallel flanges orthogonally mounted to the head for selectively receiving the first fastener therethrough.

4. An apparatus as set forth in claim 3 wherein the first leg first end includes a spherical head fixedly mounted thereon longitudinally aligned with the first leg, with the spherical head extending beyond the first leg, and a plurality of first spaced locking plates, each of the first spaced locking plates includes a semi-spherical recess, with each semi-spherical recess arranged in a facing mirror image relationship relative to one another positioning the spherical head therebetween, and a head fixedly and orthogonally mounted to the spaced locking plates, and a locking leg fastener orthogonally directed through the second space locking plates intermediate the spherical head, and spaced parallel flanges fixedly and orthogonally mounted to said head for selectively receiving the first fastener therethrough.

* * * * *